(12) United States Patent
Saraya et al.

(10) Patent No.: US 10,832,195 B2
(45) Date of Patent: Nov. 10, 2020

(54) AUTOMATED PROCUREMENT DEVICE

(71) Applicant: INTERNATIONAL BUSINESS MACHINES CORPORATION, Armonk, NY (US)

(72) Inventors: Siddharth K. Saraya, Raniganj (IN); Anurag Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 15/415,979

(22) Filed: Jan. 26, 2017

(65) Prior Publication Data
US 2018/0211196 A1 Jul. 26, 2018

(51) Int. Cl.
G06Q 10/06 (2012.01)
G06Q 10/08 (2012.01)

(52) U.S. Cl.
CPC ..... G06Q 10/06315 (2013.01); G06Q 10/087 (2013.01)

(58) Field of Classification Search
None
See application file for complete search history.

(56) References Cited

U.S. PATENT DOCUMENTS

| 2002/0188499 A1* | 12/2002 | Jenkins | G06Q 10/087 705/28 |
| 2008/0154755 A1* | 6/2008 | Lamb, III | G06Q 40/12 705/32 |
| 2008/0183599 A1* | 7/2008 | Hill | G06Q 10/087 705/28 |

(Continued)

FOREIGN PATENT DOCUMENTS

| EP | 3020014 A2 | 5/2016 |
| WO | WO2015126977 A1 | 8/2015 |
| WO | WO2016105645 A1 | 6/2016 |

OTHER PUBLICATIONS

Donnelly, Brian; "The Department of Defense's Energy Posture for the 21st Century"; 2009, University of Nebraska at Omaha; UMI No. 1469302 (Year: 2009).*

(Continued)

*Primary Examiner* — Leland Marcus
(74) *Attorney, Agent, or Firm* — Patrick J. Daugherty; Daugherty & Del Zoppo Co., LPA

(57) ABSTRACT

Processors configured by aspects of the present invention collect pricing metrics that are applicable to restocking operations executed to restock different individual commodities within different respective ones of a plurality of networked bins. In response to determining that a quantity of a first commodity within a first of the bins is below a threshold restocking level, processors combine a first restocking operation that restocks a first restocking quantity of the first commodity within the first bin with a second restocking operation that restocks a second restocking quantity of a second commodity within a second bin of the plurality of bins into a combined restocking operation, in response to determining that executing the combined restocking operation generates a combination cost saving relative to a cost of executing the first restocking operation without combining with the second restocking operation.

17 Claims, 5 Drawing Sheets

(56) References Cited

U.S. PATENT DOCUMENTS

| | | | |
|---|---|---|---|
| 2009/0125350 A1* | 5/2009 | Lessing | G06Q 10/0631 |
| | | | 705/7.12 |
| 2014/0075013 A1* | 3/2014 | Agrawal | G06F 11/3495 |
| | | | 709/224 |
| 2014/0244017 A1 | 8/2014 | Freiwirth | |
| 2016/0195859 A1 | 7/2016 | Britt et al. | |
| 2017/0140317 A1* | 5/2017 | Vann | G06Q 10/087 |
| 2017/0191693 A1* | 7/2017 | Bruhn | F24F 11/30 |
| 2017/0372243 A1* | 12/2017 | Palmer | G06Q 10/0637 |

OTHER PUBLICATIONS

Peter Mell et al, The NIST Definition of Cloud Computing, National Institute of Standards and Technology, Publication 800-145, 2011.

* cited by examiner

US 10,832,195 B2

AUTOMATED PROCUREMENT DEVICE

BACKGROUND

The Internet of Things (IoT) refers to the networking of physical "connected devices" or "smart devices" that are embedded with electronics, software, sensors, actuators, and network connectivity components that enable the objects to collect and exchange data with each other through the Internet or other communications networks. The IoT allows such devices to be controlled remotely across existing network infrastructure and thereby used to gather data through incorporated sensor components, in one aspect creating opportunities for direct integration of physical world devices and associated components into computer-based systems. An IoT network of sensors and actuators may define a cyber-physical system, such as a smart power grid, a smart home, an intelligent transportation system and a smart city, wherein each device may operate autonomously, but is also uniquely identifiable and thereby able to interoperate within an existing Internet infrastructure.

A wide variety of programmable networked devices (or "things") may linked into a IoT concept network, including heart monitoring implants, biochip transponders on farm animals, electric clams in coastal waters, automobiles with built-in sensors, DNA analysis devices used for environmental, food and pathogen monitoring, and field operation devices that assist firefighters in search and rescue operations. Such devices may collect useful data with the help of various existing technologies and then autonomously flow the data between other devices within the IoT. Examples include home automation devices that enable data gathering and network control and automation of lighting, heating, ventilation, and air conditioning HVAC) systems, and appliances (clothes and dish washers and dryers, ovens or refrigerators, freezers, etc.).

BRIEF SUMMARY

In one aspect of the present invention, a computerized method automatically combining commodity acquisition operations to generate cost savings includes executing steps on a computer processor. Thus, a computer processor collects pricing metrics that are applicable to restocking operations executed to restock different individual commodities within different respective ones of a plurality of networked bins including a first bin, in response to determining that a quantity of a first commodity within the first bin is below a threshold restocking level. The processor further combines a first restocking operation that restocks a first restocking quantity of the first commodity within the first bin with a second restocking operation that restocks a second restocking quantity of a second commodity within a second bin of the plurality of bins into a combined restocking operation, in response to determining that executing the combined restocking operation generates a combination cost saving relative to a cost of executing the first restocking operation without combining with the second restocking operation. The processor thus initiates the combined restocking operation to restock the first restocking quantity of the first commodity into the first bin with the second restocking operation of the second commodity into the second bin.

In another aspect, a system has a hardware processor in circuit communication with a computer readable memory and a computer-readable storage medium having program instructions stored thereon. The processor executes the program instructions stored on the computer-readable storage medium via the computer readable memory and thereby collects pricing metrics that are applicable to restocking operations executed to restock different individual commodities within different respective ones of a plurality of networked bins including a first bin, in response to determining that a quantity of a first commodity within the first bin is below a threshold restocking level. The processor further combines a first restocking operation that restocks a first restocking quantity of the first commodity within the first bin with a second restocking operation that restocks a second restocking quantity of a second commodity within a second bin of the plurality of bins into a combined restocking operation, in response to determining that executing the combined restocking operation generates a combination cost saving relative to a cost of executing the first restocking operation without combining with the second restocking operation. The processor thus initiates the combined restocking operation to restock the first restocking quantity of the first commodity into the first bin with the second restocking operation of the second commodity into the second bin.

In another aspect, a computer program product for automatically combining commodity acquisition operations to generate cost savings has a computer-readable storage medium with computer readable program code embodied therewith. The computer readable hardware medium is not a transitory signal per se. The computer readable program code includes instructions for execution which cause the processor to collect pricing metrics that are applicable to restocking operations executed to restock different individual commodities within different respective ones of a plurality of networked bins including a first bin, in response to determining that a quantity of a first commodity within the first bin is below a threshold restocking level. The processor is further caused to combine a first restocking operation that restocks a first restocking quantity of the first commodity within the first bin with a second restocking operation that restocks a second restocking quantity of a second commodity within a second bin of the plurality of bins into a combined restocking operation, in response to determining that executing the combined restocking operation generates a combination cost saving relative to a cost of executing the first restocking operation without combining with the second restocking operation. The processor is thus caused to initiate the combined restocking operation to restock the first restocking quantity of the first commodity into the first bin with the second restocking operation of the second commodity into the second bin.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
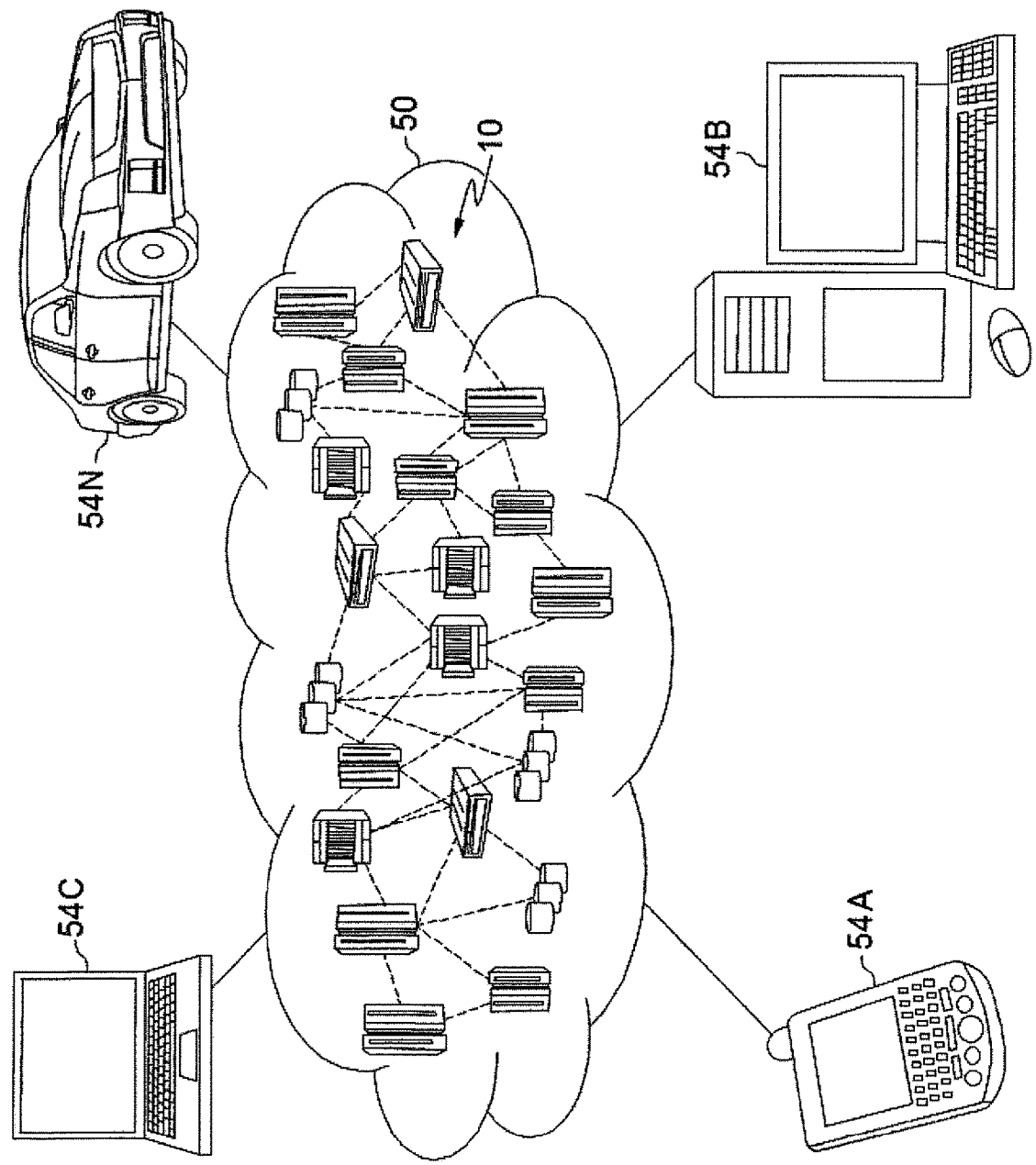
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
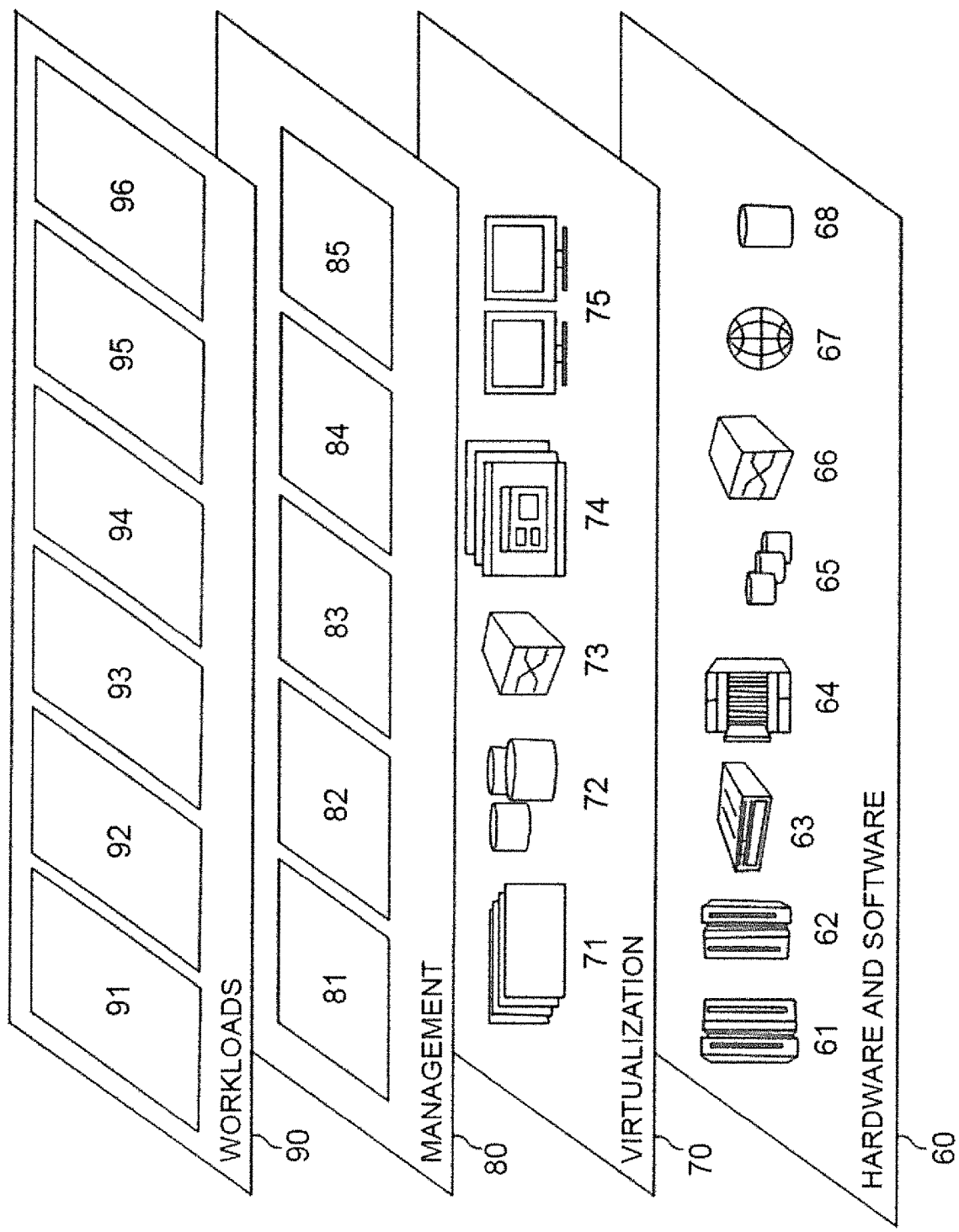
FIG. 2 depicts a cloud computing node according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Figure 4:
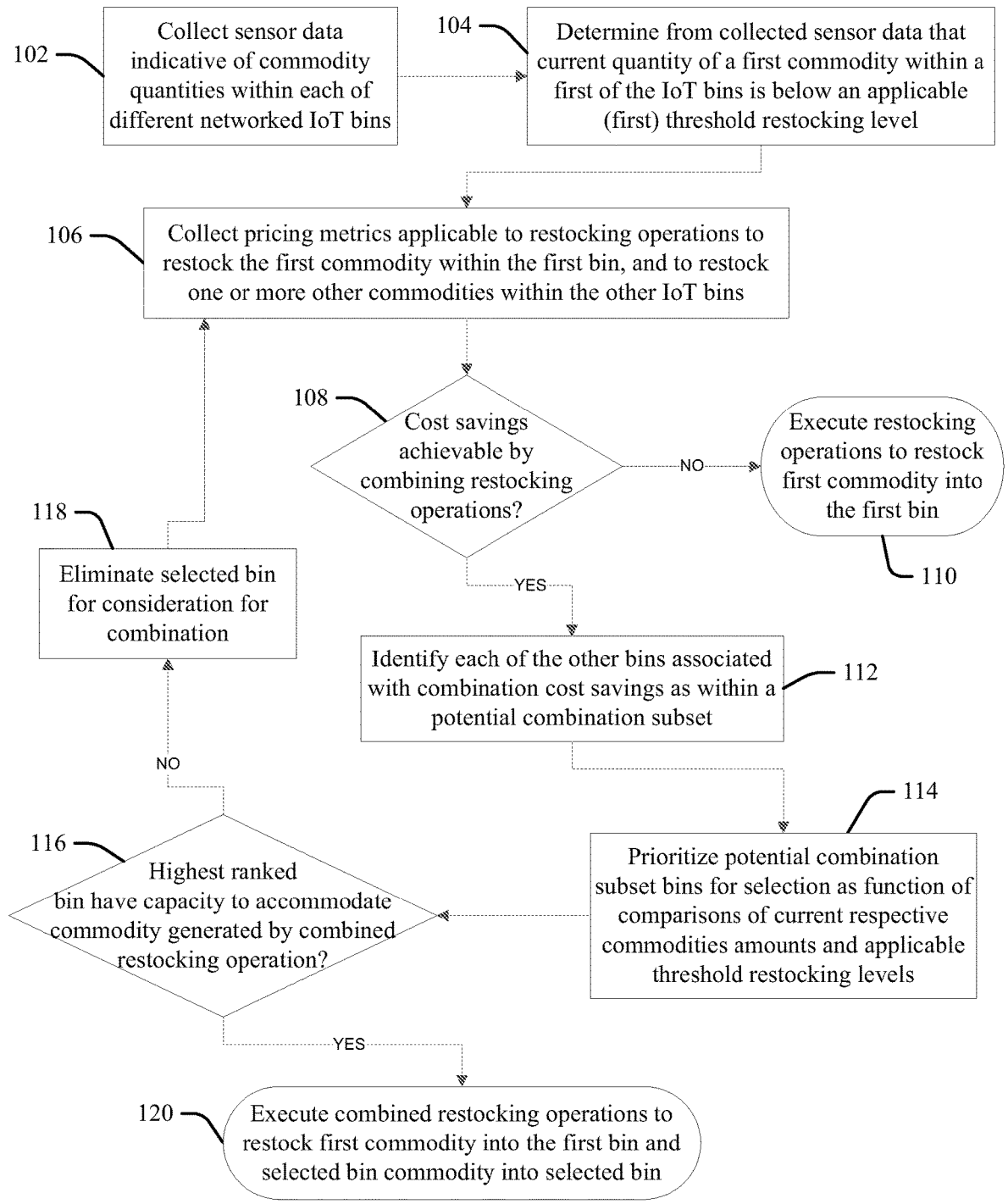
FIG. 4 is a flow chart illustration of a process or system according to an embodiment of the present invention.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for automatically combining commodity acquisition operations to maximize cost savings according to embodiments of the present invention, for example to execute the process steps or system components or tasks as depicted in FIG. 4 below.

Figure 3:
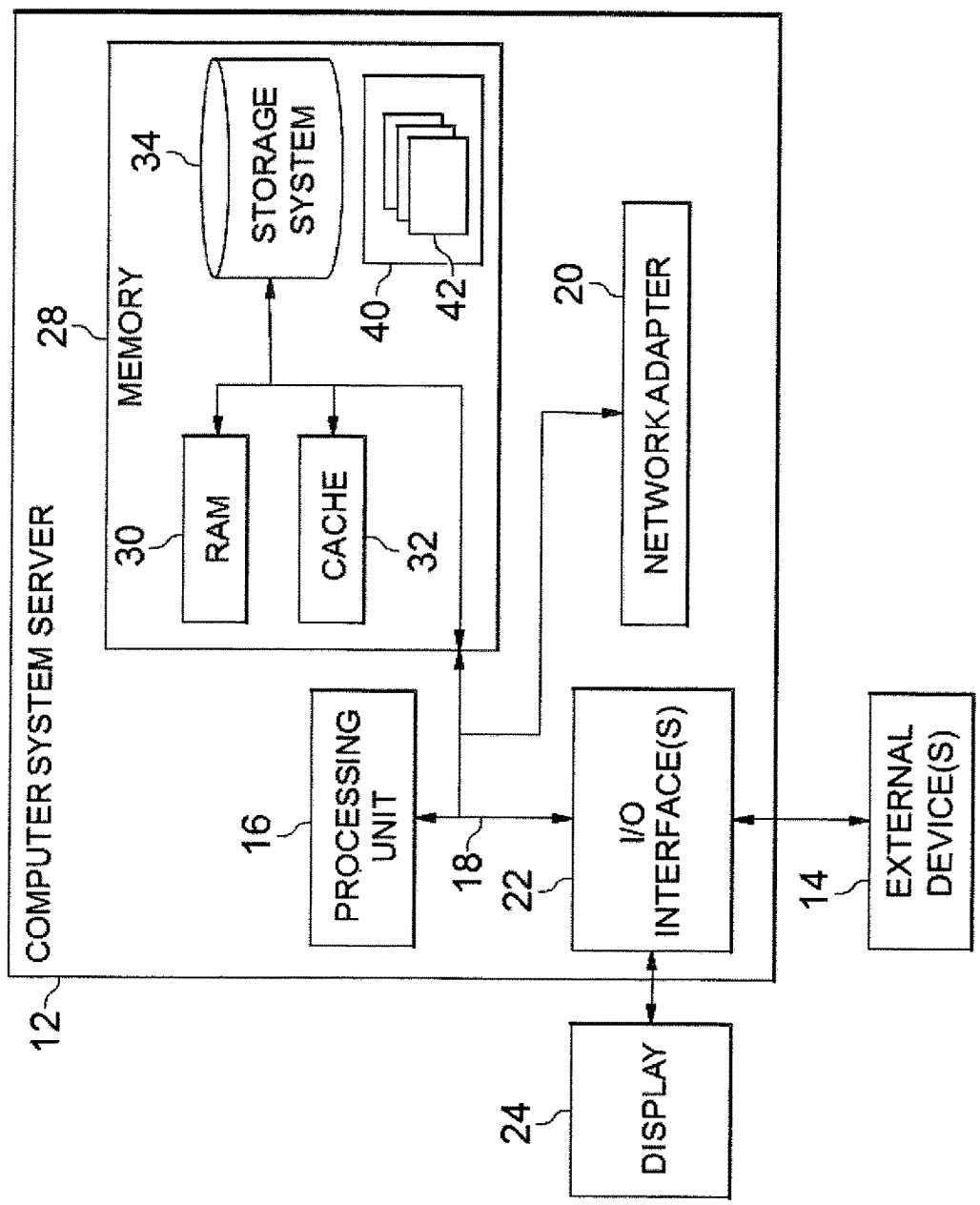
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 4 illustrates a process or system according to the present invention for an automated procurement device that automatically combines commodity acquisition operations to maximize cost savings. At 102 sensor data is collected from sensors or monitor components of each of a plurality of different networked IoT containers that is indicative of current, real-time quantities of different goods or commodities that are present and held within (or designated for) each container. Illustrative but not exhaustive examples include "smart" flour bins, beverage coolers, rice containers, etc., that use sensor and monitor components to measure, monitor or otherwise determine in real-time the amounts of the commodities held therein.

At 104 a processor configured according to the present invention (for example, the processor 16 of FIG. 3 described above) determines from the collected sensor data that the current quantity of a first commodity within a first of the plurality of IoT containers (bins) is below a (first) threshold restocking level that is applicable to that first container. The threshold restocking level for the first container is chosen by the configured processor (or set manually by a user) to provide an alert when the determined quantity within the container is below that level. In some examples the threshold restocking level is chosen to enable timely restocking of additional quantities into the first container before all quantities are consumed under current or projected consumption rates.

In some examples, the configured processor dynamically determines the threshold restocking level applied at 104 as a function of historical usage patterns (of the particular, first commodity within the first container, of a particular user utilizing the first container, from generic consumption data over time, et cetera), to provide a warning that the quantity within the first bin is of an amount that is likely to be consumed under applicable consumption rates over a restocking time period selected to be long enough to enable a user to restock replacement quantities within the first container before it is empty. Determining the restocking time period may include adding together a series of different time periods that are required to perform each of a plurality of different operations that must be executed to restock the first commodity into the first bin, for example to respectively request, purchase, ship, receive, install and restock the commodity. Some examples may also include additional tolerance time periods that are selected to account for estimated variations in consumption rates, operations execution times, unscheduled delays, etc.

At 106, in response to determining that the current quantity of the first commodity within the first bin is below the applicable (first) threshold restocking level, the configured processor communicates with one or more other servers (from databases located on the other server locations, for website resources, etc.) to collect (fetch) pricing metrics that are applicable to restocking operations executed to restock the individual commodities within their respective IoT containers, including pricing metrics that are applicable to restock the first commodity within the first container, and one or more other pricing metrics applicable to restocking other ones of the different commodities within respective other ones of the plurality of containers. Illustrative but not limiting or exhaustive examples of pricing metrics applicable to restocking operations include retailer or wholesaler promotional offers, discounts, quantity pricing, bulk shipping rates, seasonal shipping rates, time-limited offers, and still others will be apparent one skilled in the art.

At 108 the configured processor determines whether cost savings are achievable by combining any of the restocking operations executed to restock the first commodity within the first container with restocking operations executed to restock others of the commodities within their respective other containers, relative to executing said first commodity restocking operations without combination with the other operations.

If no cost savings are identified via such combinations, at 110 the configured processor executes restocking operations required to restock the first commodity into the first bin.

Otherwise, at 112, in response to determining that combining one or more of the restocking operations of the first commodity with other restocking operations of the other bins results in combination cost savings, the configured processor identifies the other bins that are associated with the combination cost savings as a potential combination subset bin of the plurality of the other bins.

At 114 the configured processor prioritizes the potential combination subset bins for selection (ranks, weights or otherwise assigns relative selection priority values) as a function of comparisons of their current respective commodities amounts and the threshold restocking levels applicable thereto. For example, the configured processor prioritizes the subset bins in proportion to amounts that their current commodity quantities are below their respective applicable threshold restocking levels, so that those for which their current commodity levels are the farthest below their threshold triggers are ranked the highest.

The configured processor may also rank the bins in the subset at 114 that have quantities more than their threshold restocking levels relative to each other in inverse proportion to the amounts of differences between their current commodity quantities and their respective applicable threshold restocking levels. Thus, the subset bins may be ranked for selection for combining their restocking operations with the restocking operation of the first bin by prioritizing bins with quantities relatively more below their threshold restocking levels, and then next prioritizing those that have quantities exceeding their thresholds but are closest to dropping below their thresholds.

At 116 the configured processor selects the highest-ranked (prioritized) bin of the potential combination subset and determines whether the selected bin has enough capacity to accommodate additional quantities of commodity generated by execution of restocking operations identified as generating cost savings when combined with the first commodity restocking operations (the combined restocking operations). Thus, at 116 the configured processor considers the additional quantities generated in combination with the current commodity levels in the selected bin.

If the selected bin does not have enough capacity to accommodate the additional quantities generated by execution of the combined restocking operation, at 118 the configured processor eliminates the selected bin from consideration for combination with the first bin, and iteratively repeats the determinations at 106 and 108 to identify any others of the bins that may generate discounts by combining restocking operations with those of the first commodity, until no bins remain for consideration, wherein the combination determinations end and at 110 the configured processor executes restocking operations required to restock the first commodity into the first bin.

Otherwise, in response to determining at 116 that the selected bin has enough capacity to accommodate additional quantities generated by execution of the combined restocking operations, at 120 the configured processor executes the combined restocking operations to restock first commodity into the first bin and the other, different commodity of selected bin into selected bin.

Figure 5:
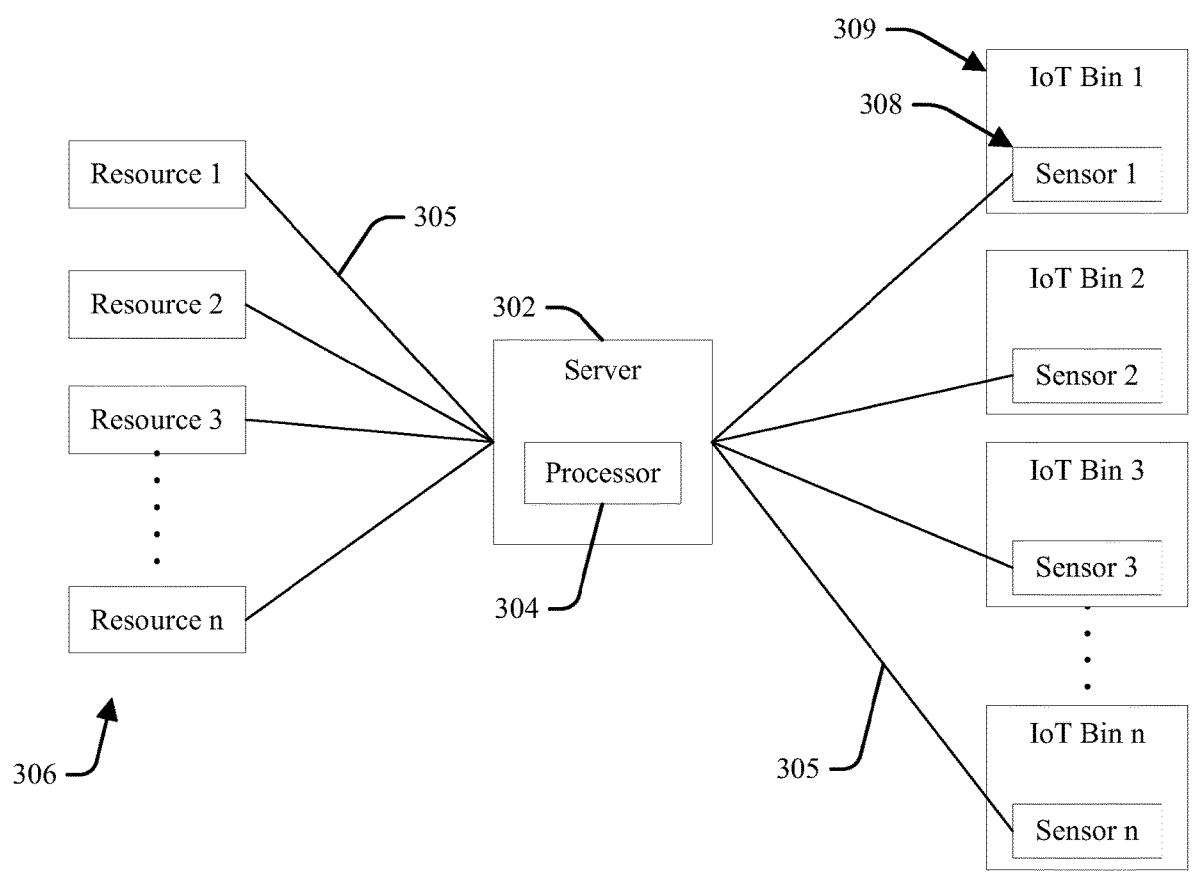
FIG. 5 depicts a network environment according to an embodiment of the present invention.

FIG. 5 illustrates a network environment wherein a server device 302 receives sensor data collected from sensors or monitor components 308 of each of a plurality of different networked IoT containers 309 via a network infrastructure or environment 305. The server 302 may include internal and external hardware components, as depicted and described in further detail above with reference to FIG. 3, including processor (processing unit) 304. In some embodiments, the network infrastructure or environment 305 is implemented in a cloud computing network environment, for example the cloud computing network environment 50 of FIG. 1 as described above.

An application executing on the processor 304 is configured according to the present invention to collect sensor data from the sensors 308 of each of the different networked IoT containers 309 that is indicative of current, real-time quantities of different goods or commodities that are present and held within (or designated for) each container, to thereby determine from the collected sensor data whether the current commodity quantities within the respective bins 309 are below applicable threshold restocking levels. In response to thereby determining that the current quantity of a commodity within one of the bins 309 is below an applicable threshold restocking level, the processor communicates with one or more other resources (other servers, database storage units, websites, etc.) 306 via the network environment 305 to fetch pricing metrics applicable to restocking operations executed to restock the individual commodities within their respective IoT containers 309. Thus, the configured processor 304 determines whether cost savings are achievable by combining restocking operations to restock the commodities within the different respective containers 309, as described more fully above with respect to FIG. 4.

Aspects of the present invention automatically determine which of a variety of commodities a user may need based on dynamically monitoring networked IoT containers for quantities therein. The aspects collect offers from a variety of different vendors, retailers, shippers, etc., to identify how a user may get maximum cost savings benefits in maintaining commodity supplies within the various containers at desired threshold levels through combining operations to take advantage of bulk or quantity discounts. Rather than routinely executing commodity replenishment orders individually, aspects recognize that combining orders may reduce shipping costs, or trigger lower pricing via increasing purchase value or shipping quantities to meet thresholds associated with discounted pricing, free shipping, etc. Aspects thereby intelligently recognize opportunities to collect multiple items into one order, or to break a list into multiple sub-lists that each trigger their own discount opportunities, to reduce overall delivery time or costs or carriers used, etc.

Aspects may identify cost savings as a function of time. For example, in some embodiments the processes at 108 or 116 (FIG. 4) described above include an iterative pause feature or step. Thus, the step of determining cost savings achievable by combining restocking operations at 108 may iteratively repeat over one or more pause periods of time to provide additional opportunities to identify cost savings opportunities as they arrive, for example to pause for a week to allow new pricing discounts to be announced and identified, prior to taking action to restock the first commodity.

Referring again to FIG. 4, the step at 116 of determining whether the highest ranked bin has capacity to accommodate more commodity generated by a combined restocking operation may include iteratively repeating one or more consumption pause periods of time, to enable consumption of commodity within the selected bin to drop below a point wherein the selected bin can accommodate the additional projected commodities provided by the combining restocking operations, so that the combined operations may move forward at 120, rather than eliminating the highest priority, selected bin for consideration at 118. Waiting for certain periods of time enables the other bins to drop their quantities below critical thresholds, to thereby enable their inclusion in restocking operations involving the collection of multiple items to get better deals from vendors, shippers, advertisers, etc.

Service providers may implement aspects of the present invention to offer services for monitoring and maintaining commodity holdings to user-defined or other preference levels as a function of costs driven by time-dependent offers appearing in dynamic advertisement environments. Service providers may charge advertisers premiums, or negotiate further discounts for users, for access to monitored commodity usage and holding levels data, so that the advertisers may tailor their offers to the needs of the user as reflected by said data, and proactively create and present combined commodity offers that meet the needs of the user as reflected by the bin monitoring data.

Users may opt in to such services on a selective basis, for example sharing only data associated with business but not personal or home bins, and excluding data associated with monitoring other IoT bins; or providing data to service providers with respect to only those bins for which supplies have fallen below threshold resupply trigger amounts. If the user chooses to share the data, aspects may direct the user to a centralized service that advertisers can also access, wherein the centralized service enables the user to look at and select available choices, offers and discounts, while keeping their personal IoT bin data confidential from the advertisers.

Other data may also be considered in identifying commodity resupply needs and preferences and possible combinations. For example, data acquired from environmental monitors and sensors (cameras, motion detectors, audio sensors, room thermostats and lighting control inputs, energy usage profiles, etc.) may be used to identify appropriate restocking and operation combination options, via analysis to understand the context of the usage, preference or need for a commodity triggering resupply operations.

In one example, a first IoT "home televisions" bin is defined as a total quantity of working televisions that are connected to authorized programmable devices provided by a cable television provider to a user within their home, office or other dwelling space, wherein a processor configured according to the present invention monitors the operative status of each television within said first bin. In response to determining that one of the monitored televisions has become inoperable, the configured processor determines that the number of televisions within said bin has fallen below the applicable resupply threshold, and responsively selects screen size and feature attributes of the replacement television commodity to resupply said bin as a function of environmental data fetched from home monitoring devices (for example, choosing an ideal screen diameter size as twice the distance from preferred seating of the user within the room to the point at which the replacement television will be installed, as a function of screen size recommendation standards for a screen resolution recommended by the cable television service provider for the services purchased by the user). The configure processor may also recognize that a home entertainment console that is identified as a commodity within a different, second IoT "home sound system" bin is nearing the end of its projected service life. Accordingly, the configured processor identifies any discounts available from promotions or other advertisements for purchasing a television at the specified screen size and resolution in combination with a home entertainment audio console that meets the user's needs as defined for the second, "home sound system" bin, and triggers presentment of one or more cost-saving combination offers to the user for confirmation and execution.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor the steps of:
receiving, via an internet-of-things infrastructure network communication, sensor device data from sensor devices of a plurality of bins within the internet-of-things infrastructure network structure;
measuring from the received sensor device data amounts of commodities that are held within each of the plurality of bins;
estimating from the measured amounts of commodities variations in rates of consumption for respective commodities that are within each of the plurality of bins;
in response to determining from the estimated rates of consumption that a quantity of a first commodity within a first bin of the plurality of networked bins is below a first threshold restocking level applicable to the first bin, communicating with a server via network communications to retrieve pricing metric values that are applicable to restocking operations to restock different individual commodities within respective ones of the plurality of networked bins;
identifying as a function of the determining pricing metric values a subset of the plurality of bins that each generate combination cost savings from combining respective ones of different restocking operations with a first restocking operation that restocks a first restocking quantity of the first commodity within the first bin;
determining from the sensor data a plurality of difference amount values, one for each of the subset plurality of bins, that current commodity quantities within each of the subset plurality of bins differ from respective threshold restocking levels that are applicable to each of the subset plurality of bins as a function of the estimated rates of consumption;
prioritizing the subset plurality of bins for selection relative to each other as a function of their respective determined difference amount values, by prioritizing ones of the subset bins having higher difference amount values determined for current commodity quantities that are below their respective applicable threshold restocking levels relative to others of the subset bins having lower difference amount values determined for current commodity quantities that are below their respective applicable threshold restocking levels, and then next prioritizing remainder others of the subset bins that each have lower difference amount values determined for current commodity quantities that are above their respective applicable threshold restocking relative to others of the reminder others subset bins having higher difference amount values determined for current commodity quantities that are above their respective applicable threshold restocking levels;
selecting a highest prioritized bin of the subset plurality of bins that has enough capacity to accommodate a second restocking quantity of a second commodity within the selected bin;
in response to determining that the combining generates a combination cost saving relative to a cost of executing the first restocking operation without combining with the second restocking operation, combining the first restocking operation that restocks the first restocking quantity of the first commodity within the first bin with the second restocking operation that restocks the second restocking quantity of the second commodity within the selected bin of the subset plurality of bins into a combined restocking operation; and
executing the combined restocking operation by restocking the first restocking quantity of the first commodity into the first bin and restocking the second restocking quantity of the second commodity into the selected bin of the subset plurality of bins.

2. The method of claim 1, wherein the collected pricing metrics are selected from the group consisting of a retailer promotional offer, a wholesaler promotional offer, a bulk purchase discount, a quantity price, a bulk shipping rate, a seasonal shipping rate and a time-limited offer.

3. The method of claim 1, further comprising:
defining the first restocking operation to select a replacement item that meets requirements of user preference data acquired from environmental monitor data acquired from a dwelling space of a user.

4. The method of claim 3, wherein the user preference data is selected from the group consisting of camera data, user motion detector data, room size dimension data, audio sensor data, room thermostat setting data, lighting control input data and energy usage profile data.

5. The method of claim 1, further comprising:
selecting the first threshold restocking level as a replacement amount of the first commodity that is likely to be consumed under an applicable consumption rate over a restocking time period.

6. The method of claim 5, further comprising:
determining the restocking time period as a sum of a series of different time periods that are selected from the group consisting of a requesting time period, a purchasing time period, a shipping time period, a receiving time period, an installation time period and a restocking time period.

7. The method of claim 1, further comprising:
integrating computer-readable program code into a computer system comprising a processor, a computer readable memory in circuit communication with the processor, and a computer readable storage medium in circuit communication with the processor; and
wherein the processor executes program code instructions stored on the computer-readable storage medium via the computer readable memory and thereby performs the steps of estimating the variations in rates of consumption, communicating with the server to retrieve the pricing metric values in response to determining from the collected sensor data that the quantity of the first commodity within the first bin is below the threshold restocking level applicable to the first bin, identifying as a function of the determining pricing metric values the subset of the plurality of bins, determining the plurality of difference amount values, prioritizing the subset plurality of bins for selection relative to each other, selecting a highest prioritized bin of the subset plurality of bins that has enough capacity to accommodate the second restocking quantity of the second commodity within the selected bin, combining the first restocking operation with the second restocking operation into the combined restocking operation in response to determining that executing the combined restocking operation generates the combination cost saving relative to the cost of executing the first restocking operation without combining with the second restocking operation, and executing the combined restocking operation.

8. The method of claim 7, wherein the computer-readable program code is provided as a service in a cloud environment.

9. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
receives, via an internet-of-things infrastructure network communication, sensor device data from sensor devices of a plurality of bins within the internet-of-things infrastructure network structure;
measures from the received sensor device data amounts of commodities that are held within each of the plurality of bins;
estimates from the measured amounts of commodities variations in rates of consumption for respective commodities that are within each of the plurality of bins;
in response to determining from the estimated rates of consumption that a quantity of a first commodity within a first bin of the plurality of networked bins is below a first threshold restocking level applicable to the first bin, communicates with a server via network communications to retrieve pricing metric values that are applicable to restocking operations to restock different individual commodities within different respective ones of the plurality of networked bins including the first bin;
identifies as a function of the determining pricing metric values a subset of the plurality of bins that each generate combination cost savings from combining respective ones of different restocking operations with a first restocking operation that restocks a first restocking quantity of the first commodity within the first bin;
determines from the sensor data a plurality of difference amount values, one for each of the subset plurality of bins, that current commodity quantities within each of the subset plurality of bins differ from respective threshold restocking levels that are applicable to each of the subset plurality of bins as a function of the estimated rates of consumption;
prioritizes the subset plurality of bins for selection relative to each other as a function of their respective determined difference amount values, by prioritizing ones of the subset bins having higher difference amount values determined for current commodity quantities that are below their respective applicable threshold restocking levels relative to others of the subset bins having lower difference amount values determined for current commodity quantities that are below their respective applicable threshold restocking levels, and then next prioritizing remainder others of the subset bins that each have lower difference amount values determined for current commodity quantities that are above their respective applicable threshold restocking relative to others of the reminder others subset bins having higher difference amount values determined for current commodity quantities that are above their respective applicable threshold restocking levels;
selects a highest prioritized bin of the subset plurality of bins that has enough capacity to accommodate a second restocking quantity of a second commodity within the selected bin;
in response to determining that the combining generates a combination cost saving relative to a cost of executing the first restocking operation without combining with the second restocking operation, combines the first restocking operation that restocks the first restocking quantity of the first commodity within the first bin with the second restocking operation that restocks the second restocking quantity of the second commodity within the selected bin of the subset plurality of bins into a combined restocking operation; and
executes the combined restocking operation by restocking the first restocking quantity of the first commodity into the first bin and restocking the second restocking quantity of the second commodity into the selected bin of the subset plurality of bins.

10. The system of claim 9, wherein the processor executes the program instructions stored on the computer-readable storage medium via the computer readable memory and thereby further:

defines the first restocking operation to select a replacement item that meets requirements of user preference data acquired from environmental monitor data acquired from a dwelling space of a user.

11. The system of claim 10, wherein the user preference data is selected from the group consisting of camera data, user motion detector data, room size dimension data, audio sensor data, room thermostat setting data, lighting control input data and energy usage profile data.

12. The system of claim 9, wherein the processor executes the program instructions stored on the computer-readable storage medium via the computer readable memory and thereby further:

selects the first threshold restocking level as a replacement amount of the first commodity that is likely to be consumed under an applicable consumption rate over a restocking time period.

13. The system of claim 12, wherein the processor executes the program instructions stored on the computer-readable storage medium via the computer readable memory and thereby further:

determines the restocking time period as a sum of a series of different time periods that are selected from the group consisting of a requesting time period, a purchasing time period, a shipping time period, a receiving time period, an installation time period and a restocking time period.

14. A computer program product for automatically combining commodity acquisition operations to maximize cost savings, the computer program product comprising:

a computer readable storage medium having computer readable program code embodied therewith, wherein the computer readable storage medium is not a transitory signal per se, the computer readable program code comprising instructions for execution by a processor that cause the processor to:

receive, via an internet-of-things infrastructure network communication, sensor device data from sensor devices of a plurality of bins within the internet-of-things infrastructure network structure;

measure from the received sensor device data amounts of commodities that are held within each of the plurality of bins;

estimate from the measured amounts of commodities variations in rates of consumption for respective commodities that are within each of the plurality of bins;

in response to determining from the estimated rates of consumption that a quantity of a first commodity within a first bin of the plurality of networked bins is below a first threshold restocking level applicable to the first bin, communicate with a server via network communications to retrieve pricing metric values that are applicable to restocking operations to restock different individual commodities within different respective ones of the plurality of networked bins including the first bin;

identify as a function of the determining pricing metric values a subset of the plurality of bins that each generate combination cost savings from combining respective ones of different restocking operations with a first restocking operation that restocks a first restocking quantity of the first commodity within the first bin;

determine from the sensor data a plurality of difference amount values, one for each of the subset plurality of bins, that current commodity quantities within each of the subset plurality of bins differ from respective threshold restocking levels that are applicable to each of the subset plurality of bins as a function of the estimated rates of consumption;

prioritize the subset plurality of bins for selection relative to each other as a function of their respective determined difference amount values, by prioritizing ones of the subset bins having higher difference amount values determined for current commodity quantities that are below their respective applicable threshold restocking levels relative to others of the subset bins having lower difference amount values determined for current commodity quantities that are below their respective applicable threshold restocking levels, and then next prioritizing remainder others of the subset bins that each have lower difference amount values determined for current commodity quantities that are above their respective applicable threshold restocking relative to others of the reminder others subset bins having higher difference amount values determined for current commodity quantities that are above their respective applicable threshold restocking levels;

select a highest prioritized bin of the subset plurality of bins that has enough capacity to accommodate a second restocking quantity of a second commodity within the selected bin;

in response to determining that the combining generates a combination cost saving relative to a cost of executing the first restocking operation without combining with the second restocking operation, combine the first restocking operation that restocks the first restocking quantity of the first commodity within the first bin with the second restocking operation that restocks the second restocking quantity of the second commodity within the second bin of the plurality of bins into a combined restocking operation; and execute the combined restocking operation by restocking the first restocking quantity of the first commodity into the first bin and restocking the second restocking quantity of the second commodity into the selected bin of the subset plurality of bins.

15. The computer program product of claim 14, wherein the computer readable program code instructions for execution by the processor further cause the processor to:

define the first restocking operation to select a replacement item that meets requirements of user preference data acquired from environmental monitor data acquired from a dwelling space of a user.

16. The computer program product of claim 15, wherein the user preference data is selected from the group consisting of camera data, user motion detector data, room size dimension data, audio sensor data, room thermostat setting data, lighting control input data and energy usage profile data.

17. The computer program product of claim 14, wherein the computer readable program code instructions for execution by the processor further cause the processor to:

selects the first threshold restocking level as a replacement amount of the first commodity that is likely to be consumed under an applicable consumption rate over a restocking time period; and determine the restocking time period as a sum of a series of different time periods that are selected from the group consisting of a requesting time period, a purchasing time period, a shipping time period, a receiving time period, an installation time period and a restocking time period.

* * * * *